(12) United States Patent
Whitmore et al.

(10) Patent No.: US 10,527,004 B2
(45) Date of Patent: Jan. 7, 2020

(54) RESTARTABLE IGNITION DEVICES, SYSTEMS, AND METHODS THEREOF

(71) Applicants: Stephen A. Whitmore, Logan, UT (US); Nathan Inkley, Hewitt, TX (US); Daniel P. Merkley, Layton, UT (US)

(72) Inventors: Stephen A. Whitmore, Logan, UT (US); Nathan Inkley, Hewitt, TX (US); Daniel P. Merkley, Layton, UT (US)

(73) Assignee: Utah State University, Logan, UT (US)

( * ) Notice: Subject to any disclaimer, the term of this patent is extended or adjusted under 35 U.S.C. 154(b) by 527 days.

(21) Appl. No.: 14/802,537

(22) Filed: Jul. 17, 2015

(65) Prior Publication Data

US 2015/0322892 A1 Nov. 12, 2015

Related U.S. Application Data

(63) Continuation-in-part of application No. 13/953,877, filed on Jul. 30, 2013, now abandoned.

(Continued)

(51) Int. Cl.
*F02K 9/94* (2006.01)
*H01T 13/20* (2006.01)
(Continued)

(52) U.S. Cl.
CPC ............ *F02K 9/94* (2013.01); *F02K 9/72* (2013.01); *F02K 9/95* (2013.01); *H01T 13/20* (2013.01); *H01T 21/02* (2013.01)

(58) Field of Classification Search
CPC ......... H01T 13/08; H01T 13/20; H01T 13/32; H01T 13/50; H01T 13/52; H01T 13/467;
(Continued)

(56) References Cited

U.S. PATENT DOCUMENTS 4,369,710 A 1/1983 Okamoto et al.
4,795,938 A * 1/1989 Meredith ............... H01T 13/32
123/169 E (Continued)

FOREIGN PATENT DOCUMENTS

EP 1533511 A1 5/2005
EP 2524727 A1 11/2012

OTHER PUBLICATIONS

Wilson et al., Catalytic decomposition of nitrous oxide monopropellant for hybrid motor re-ignition, 47th AIAA/ASME/SAE/ASEE Joint Propulsion Conference & Exhibit, Jul. 31, 2011.

(Continued)

*Primary Examiner* — Mark A Laurenzi
*Assistant Examiner* — Loren C Edwards

(57) ABSTRACT

Devices, methods, and systems for providing a restartable ignition system for a hybrid rocket system. In one embodiment, an ignition device includes a housing and at least two electrodes. The housing includes a first side and a second side and defines a bore with an axis extending therethrough between the first and second sides, the bore defining an internal surface of the housing. The at least two electrodes extend through the housing to the internal surface. The at least two electrodes are configured to be spaced apart so as to provide an electrical potential field along the internal surface between the at least two electrodes. Such housing is formed with and includes multiple flat layers such that the multiple flat layers provide ridges along the internal surface. With this arrangement, the internal surface with the ridges are configured to concentrate an electrical charge upon being subjected to the electrical potential field.

18 Claims, 4 Drawing Sheets

Related U.S. Application Data

(60) Provisional application No. 62/026,420, filed on Jul. 18, 2014, provisional application No. 61/677,254, filed on Jul. 30, 2012, provisional application No. 61/677,266, filed on Jul. 30, 2012, provisional application No. 61/677,418, filed on Jul. 30, 2012, provisional application No. 61/677,426, filed on Jul. 30, 2012, provisional application No. 61/677,298, filed on Jul. 30, 2012.

(51) Int. Cl.
  *H01T 21/02* (2006.01)
  *F02K 9/72* (2006.01)
  *F02K 9/95* (2006.01)

(58) Field of Classification Search
  CPC .......... H01T 21/02; F02M 57/06; F02P 9/007; F42C 19/0819; F42C 19/0826
  USPC .......................................... 60/251
  See application file for complete search history.

(56) References Cited

U.S. PATENT DOCUMENTS

| | | | | |
|---|---|---|---|---|
| 5,715,675 | A | * | 2/1998 | Smith ................. F02K 9/72 60/251 |
| 5,892,319 | A | * | 4/1999 | Rossi ................. H01T 13/467 313/118 |
| 6,058,697 | A | | 5/2000 | Smith |
| 6,393,830 | B1 | | 5/2002 | Hamke |
| 6,779,335 | B2 | | 8/2004 | Herdy |
| 7,716,912 | B2 | | 5/2010 | Cover |
| 8,015,920 | B1 | * | 9/2011 | Wilkinson ............. F02K 9/80 102/287 |
| 8,225,507 | B2 | | 7/2012 | Fuller |
| 8,327,617 | B2 | | 12/2012 | Gustafsson |
| 8,336,287 | B1 | | 12/2012 | Petersen et al. |
| 8,539,753 | B2 | | 9/2013 | Macklin |
| 2002/0121081 | A1 | | 9/2002 | Cesaroni et al. |
| 2003/0136111 | A1 | | 7/2003 | Kline et al. |
| 2004/0068979 | A1 | * | 4/2004 | Kline ................. C06C 9/00 60/256 |
| 2009/0217525 | A1 | | 9/2009 | Fuller |
| 2009/0217642 | A1 | | 9/2009 | Fuller |
| 2012/0060468 | A1 | | 3/2012 | Dushku et al. |
| 2012/0285016 | A1 | | 7/2012 | Fuller |
| 2013/0031888 | A1 | | 2/2013 | Fuller |
| 2013/0042596 | A1 | | 2/2013 | Fuller |

OTHER PUBLICATIONS

Eilers, et al., Development and testing of the regeneratively cooled multiple use plug hybrid (for) nanosats (MUPHyN) motor, 48th AIAA/ASME/SAE/ASEE Joint Propulsion Conference & Exhibit, Jul. 29, 2012.
McCulley, et al., Design and testing of fdm manufactured paraffin-abs hybrid rocket motors, 48th AIAA/ASME/SAE/ASEE Joint Propulsion Conference & Exhibit, Jul. 29, 2012.
Peterson et al., Closed-loop thrust and pressure profile throttling of a nitrous-oxide htpb hybrid rocket motor, 48th AIAA/ASME/SAE/ASEE Joint Propulsion Conference & Exhibit, Jul. 29, 2012.
Whitmore, et al., Analytical and experimental comparisons of htpb and abs as hybrid rocket fuels, 47th AIAA/ASME/SAE/ASEE Joint Propulsion Conference & Exhibit, Jul. 31, 2011.
Goldstein, The Greening of Satellite Propulsion, Aerospace America, Feb. 2012.
Safie, F. M., and Fox, E. P., A Probabilistic Design Analysis Approach for Launch Systems, AIAA-1991-1186, 27th AIAA, SAE, ASME, and ASEE, Joint Propulsion Conference, Sacramento, CA; USA; Jun. 24-26, 1991.
Chang, Investigation of Space Launch Vehicle Catastrophic Failures, Journal of Spacecraft and Rockets, vol. 33, No. 2, Mar.-Apr. 1996.
Maggio, G., Space Shuttle Probabilistic Risk Assessment: Methodology and Application, International Symposium on Product Quality and Integrity, Proceedings of the Reliability and Maintainability Symposium, Las Vegas, NV, USA, Jan. 22-25, 1996.
Gibbon et al., Investigation of an Alternative Geometry Hybrid Rocket for Small Spacecraft Orbit Transfer, Tech. rep., Surrey Satellite Technology Ltd, Jul. 27, 2001.
Knuth et al., Solid-Fuel Regression Rate Behavior of Vortex Hybrid Rocket Engines, The Journal of Propulsion and Power, vol. 18, No. 3, pp. 600-609, May-Jun. 2002.
Lemieux, P., Nitrous Oxide Cooling in Hybrid Rocket Nozzles, Progress in Aerospace Sciences, vol. 46, pp. 106-115, Dec. 29, 2009.
Lemieux, P., Development of a Reusable Aerospike Nozzle for Hybrid Rocket Motors, 39th AIAA Fluid Dynamics Conference, Jun. 22, 2009.
Grieb, J., Design and Analysis of a Reusable N2O-Cooled Aerospike Nozzle for Labscale Hybrid Rocket Motor Testing, Master's Thesis presented to the Faculty of California Polytechnic State University, Feb. 2012.
Mayer, E., Analysis of Convective Heat Transfer in Rocket Nozzles, ARS Journal, pp. 911-916, 1961.
Gordon, S. and McBride, B. J., "Computer Program for Calculation of Complex Chemical Equilibrium Compositions and Applications I. Analysis," Tech. rep., NASA RP-1311, 1994.
McBride, B. J. and Gordon, S., Computer Program for Calculation of Complex Chemical Equilibrium Compositions and Applications II, Users Manual and Program Description, Tech. rep., NASA RP-1311, Oct. 1994.
Span, R. and Wagner, W., "Equations of State for Technical Applications. I. Simultaneously Optimized Functional Forms for Nonpolar and Polar Fluids," International Journal of Thermophysics, vol. 24, No. 1, pp. 1-39, Jan. 1, 2003.
Span, R. and Wagner, W., Equations of State for Technical Applications. II. Results for Nonpolar Fluids, International Journal of Thermophysics, vol. 24, No. 1, pp. 41-109, Jan. 1, 2003.
Span, R. and Wagner, W., Equations of State for Technical Applications. III. Results for Polar Fluids, International Journal of Thermophysics, vol. 24, No. 1, pp. 111-162, Jan. 1, 2003.
Dyer et al., Modeling Feed System Flow Physics for Self Pressurizing Propellants, 43rd AIAA/ASME/SAE/ASEE Joint Propulsion Conference & Exhibit, Jul. 8, 2007.
Whitmore, et al., Development of a Power Efficient, Restart-Capable Arc Ignitor for Hybrid Rockets, 50th AIAA/ASME/SAE/ASEE Joint Propulsion Conference and Exhibit, Jul. 28, 2014, AIAA-2014-3949, American Institute of Aeronautics and Astronautics, Cleveland OH.
USPTO, Non-Final Office Action for U.S. Appl. No. 13/953,877 for "Multiple Use Hybrid Rocket Motor" filed Jul. 30, 2013, Office Action dated Jan. 20, 2016.
Eilers, et al., Analytical and Experimental Evaluation of Aerodynamic Thrust Vectoring on an Aerospike Nozzle, 46th AIAA/ASME/SAE/ASEE Joint Propulsion Conference & Exhibit, Jul. 25, 2010, Nashville, TN.
Approctech, Pyro Free Ignition of Hybrid Rocket Motor with Wax/Epoxy Resin Grain, YouTube.com, Nov. 9, 2010.
NASA, Space Handbook: Astronautics and Its Applications, Staff Report of the Select Committee on Astronautics and Space Exploration, Chapter 6: Propellants, retrieved from https://history.nasa.gov/conghand/propelnt.htm.

* cited by examiner

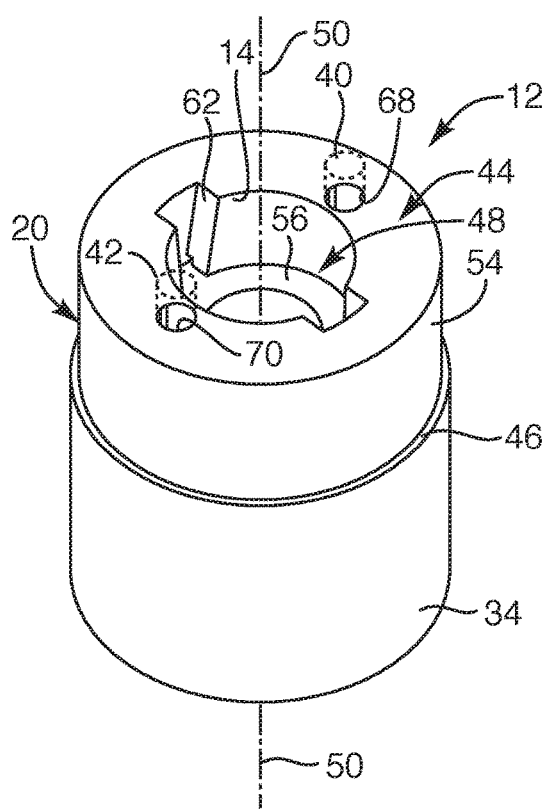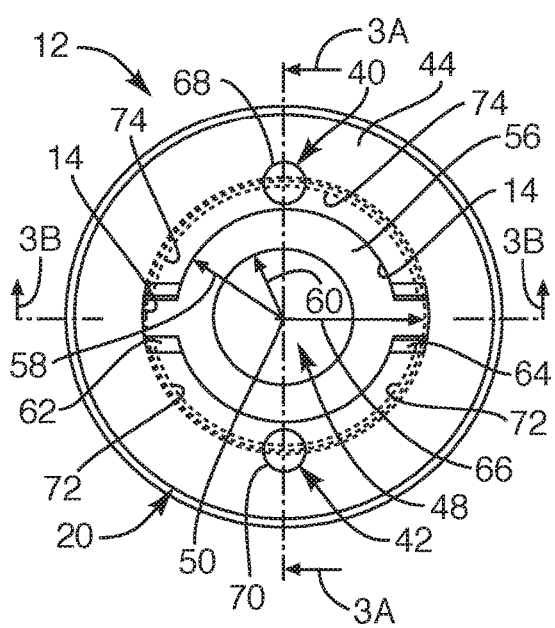
FIG. 2
FIG. 3
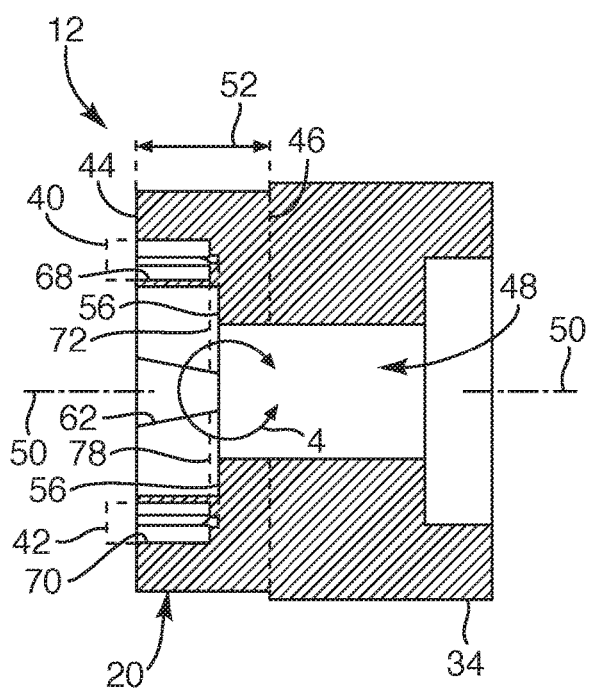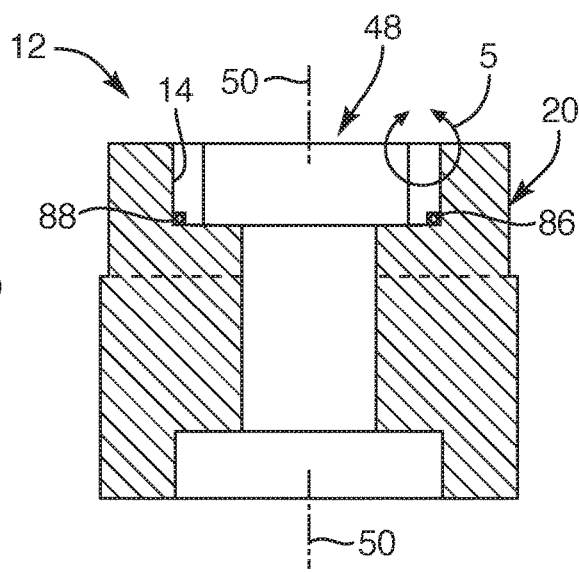
FIG. 3A
FIG. 3B

RESTARTABLE IGNITION DEVICES, SYSTEMS, AND METHODS THEREOF

CROSS-REFERENCE TO RELATED APPLICATIONS

This application is a continuation-in-part application to U.S. Non-provisional application Ser. No. 13/953,877, filed on Jul. 30, 2013 and entitled "Multiple Use Hybrid Rocket Motor," which is hereby incorporated by reference in its entirety and which claims the benefit under 35 U.S.C. § 119(e) of U.S. Provisional Application Nos. 61/677,254; 61/677,266; 61/677,418; 61/677,426; and 61/677,298; all filed Jul. 30, 2012, and all of which are hereby incorporated by reference in their entirety.

This application also claims priority to U.S. Provisional Application No. 62/026,420, filed on Jul. 18, 2014, and entitled "Restartable Ignition Devices, Systems, and Methods Thereof," which is herein incorporated by this reference in its entirety.

GOVERNMENT SPONSORED RESEARCH

This invention was made with government support under contract NNX12AN12G awarded by NASA. The government has certain rights in the invention.

TECHNICAL FIELD

The present invention relates generally to hybrid rocket systems and, more specifically, to devices, systems and methods of an ignition portion of a hybrid rocket system.

BACKGROUND

The current state of the art for hybrid rocket ignition systems is largely based on pyrotechnic ignition methods. These methods have serious shortcomings including the inability to initiate multiple re-starts using a single device, thus, limiting the applicability of the hybrid rocket. Other shortcomings include significant physical and environmental hazards. For example, making rockets safer, less toxic, and less explosive comes at a significant cost. As the propellant materials become less volatile, they also become increasingly difficult to ignite. Combustion of hybrid propellants must be initiated by an igniter that provides sufficient heat to cause pyrolysis of the solid fuel grain at the head end of the motor, while simultaneously providing sufficient residual energy to overcome the activation energy of the propellants to initiate combustion. Thus, hybrid rockets have typically used large, high output pyrotechnic charges to initiate combustion. Such igniters are capable of producing very high-enthalpy outputs, but are extremely susceptible to hazards of electromagnetic radiation and present significant operational hazards. Most importantly, such pyrotechnic igniters are designed as "one-shot" devices that do not allow multiple re-start capability.

BRIEF SUMMARY OF THE INVENTION

The inventors of the present disclosure have identified that it would be advantageous to provide a hybrid rocket ignition system that has re-start capability that also is safe, less toxic, and less explosive than the current state-of-the-art rocket systems.

Embodiments of the present invention are directed to various devices, systems and methods of providing a re-startable ignition device for a hybrid rocket system. For example, in one embodiment, an ignition device includes a housing and at least two electrodes. The housing includes a first side and a second side and defines a bore with an axis extending therethrough between the first and second sides, the bore defining an internal surface of the housing. The at least two electrodes extend through the housing to the internal surface. The at least two electrodes are configured to be spaced apart so as to provide an electrical potential field along the internal surface between the at least two electrodes. Such housing is formed with and includes multiple flat layers such that the multiple flat layers provide ridges along the internal surface. With this arrangement, the internal surface with the ridges are configured to concentrate an electrical charge upon being subjected to the electrical potential field.

In one embodiment, the ridges, under the electrical potential field, act as miniature electrodes to arc the electrical charge. In another embodiment, the internal surface includes grooves, each groove extending between two adjacently extending ridges. In still another embodiment, each of the ridges are a periphery of each of the multiple flat layers.

In another embodiment, the multiple flat layers each define a plane oriented transverse relative to the axis of the bore. In another embodiment, the at least two electrodes define a line therebetween, the line being generally parallel with a plane defined by each of the multiple flat layers.

In another embodiment, the internal surface defines a step configuration such that the bore at the first side is larger than the bore at the second side, the step configuration exhibiting a shelf extending to a shelf notch, the shelf notch having the at least two electrodes. In another embodiment, the bore at the first side defines a first width and the bore at the second side defines a second width, the first width greater than the second width. In yet another embodiment, the bore includes a convergent configuration extending from the first side to the second side.

In another embodiment, the multiple layers are an Acrylonitrile Butadiene Styrene (ABS) material. Such multiple layers may be formed with a fused deposition modeling process or three-dimensional printing.

In accordance with another embodiment of the present invention, a method of forming an ignition device, is provided. The method includes: forming a housing with multiple flat layers, the housing having a first side and a second side defining a bore with an axis extending through the housing and between the first and second sides such that the bore is defined by an internal surface of the housing; and positioning at least two electrodes to extend through the housing to the internal surface such that the at least two electrodes are spaced and configured to provide an electrical potential field along the internal surface between the at least two electrodes; wherein the forming the housing with multiple flat layers step includes forming the internal surface to include ridges, the ridges along the internal surface being configured to concentrate an electrical charge upon being subjected to the electrical potential field.

In one embodiment, the method step of forming the internal surface to include ridges includes the step of forming multiple miniature electrodes configured to arc the electrical charge between the at least two electrodes. In another embodiment, the method step of forming the housing with multiple flat layers includes the step of forming the multiple flat layers in a plane oriented transverse relative to the axis of the bore. In still another embodiment, the method step of positioning the at least two electrodes includes the step of positioning the at least two electrodes to define a line therebetween such that the line is generally parallel with a plane defined by each of the multiple flat layers.

In another embodiment, the method step of forming the housing with multiple flat layers includes the step of forming the bore of the housing to include a step configuration to define a shelf. In another embodiment, the method step of forming the housing with multiple flat layers includes forming the bore of the housing to include a convergent configuration extending from the first side to the second side of the housing.

In another embodiment, the method step of forming the housing with multiple flat layers includes the step of forming the housing with layers of a solid grain fuel material. In another embodiment, the method step of forming the housing with multiple flat layers includes forming the housing with layers of an Acrylonitrile Butadiene Styrene (ABS) material.

In accordance with another embodiment of the present invention, a hybrid rocket system is provided. The hybrid rocket system includes a container, an ignition portion, a solid grain combustion portion, a post combustion portion, and a nozzle. The container is sized to contain liquid or gaseous fuel. The ignition portion includes a first side and a second side, the ignition portion defining a bore with an axis extending therethrough between the first and second sides, the bore defined by an internal surface and the bore configured to receive the fuel from the container. The ignition portion includes at least two electrodes configured to provide an electrical potential field along the internal surface between the at least two electrodes. The solid grain combustion portion defines a combustion chamber such that the combustion chamber corresponds with the bore of the ignition portion. The post combustion portion is coupled to the solid grain combustion portion. The nozzle is coupled to the post combustion portion and is configured to manipulate thrust to the rocket system. The ignition portion is formed with and includes multiple flat layers such that the multiple flat layers provide ridges along the internal surface. With this arrangement, the internal surface with the ridges are configured to concentrate an electrical charge generally between the at least two electrodes upon being subjected to the electrical potential field.

In one embodiment, the multiple flat layers each define a plane oriented transverse relative to the axis of the bore.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 2 is a perspective view of an igniter system of a hybrid rocket system, according to another embodiment of the present invention;

FIG. 3 is top view of the igniter system of FIG. 2, according to another embodiment of the present invention;

FIG. 3A is a cross-sectional view of the igniter system taken along section 3A of FIG. 3, according to another embodiment of the present invention;

FIG. 3B is a cross-sectional view of the igniter system taken along section 3B of FIG. 3, according to another embodiment of the present invention;

DETAILED DESCRIPTION OF THE INVENTION

Figure 1:
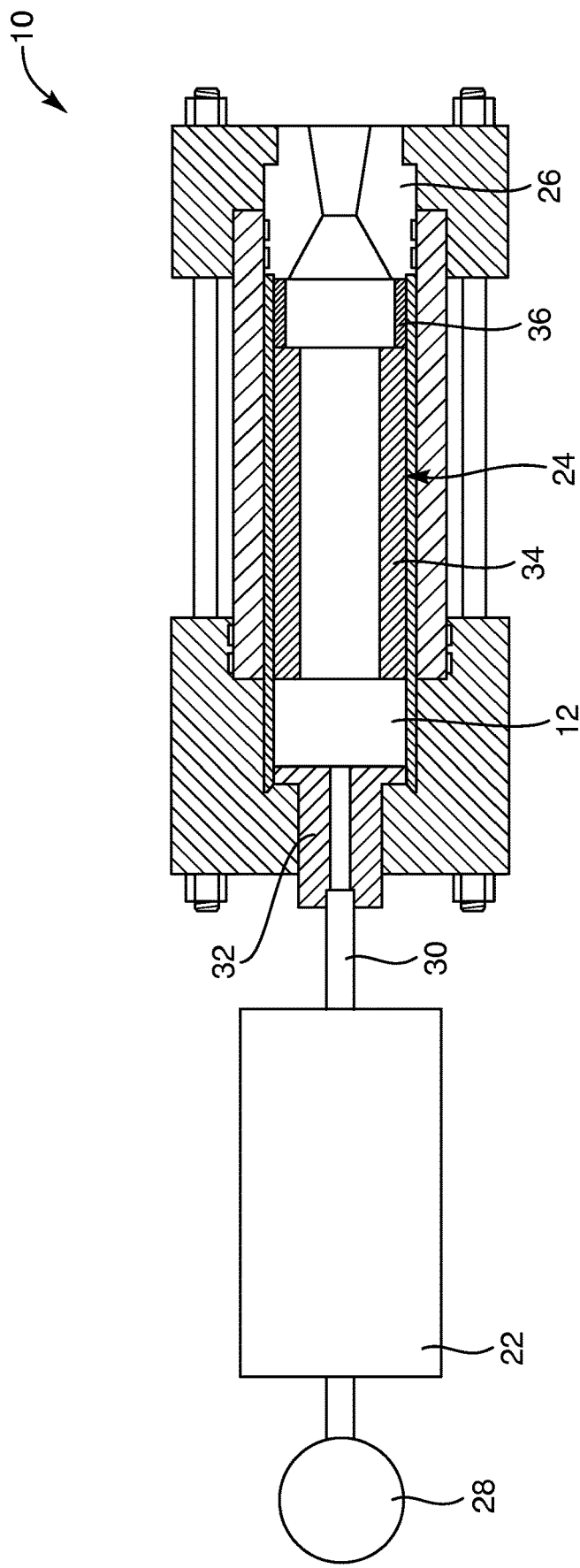
FIG. 1 is a simplified side view of a hybrid rocket system, according to one embodiment of the present invention.
Figure 6:
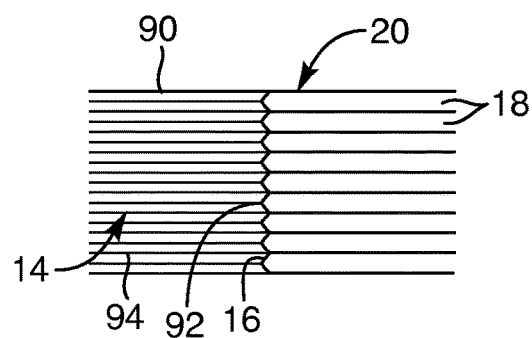
FIG. 6 is an enlarged view of detail 6 in FIG. 5, depicting ridges and grooves of the multiple layers defined in the igniter portion, according to another embodiment of the present invention.

Referring to FIGS. 1 and 2, a simplified view of a hybrid rocket system 10 or motor that includes an ignition system 12 or pre-combustion portion, according to the present invention, is provided. Referring to FIGS. 3A, 3B, and 6, in one embodiment, the ignition system 12 or pre-combustion portion may include a housing 20 formed of multiple flat layers 18 by employing fused deposition modeling (FDM) or three-dimensional printing. Such FDM process provides an internal surface 14 with ridges 16 formed from the multiple flat layers 18 deposited upon each other (See FIG. 6). The ignition system 12 may also include electrodes 86 and 88 spaced from each other and positioned adjacent the internal surface 14. Upon a propellant or oxidizer being injected into the system and activating an electrical potential field between the electrodes 86 and 88, the ridges 16 along the internal surface 14 may concentrate an electrical charge which seeds combustion of the solid grain fuel material.

As will be described herein, the unique structural characteristics of the material and structure of the internal surface 14 and housing 20 provide an ignition system 12 that is re-startable. For example, multiple re-starts have been implemented with the ignition system 12 set forth herein. The inventors have found that the only limitation to the number of allowable restarts is the quantity of solid fuel grain material contained within the ignition system 12. Such ignition system 12 may require small input energy and may use only non-toxic and non-explosive propellants with the simplicity and reliability of a monopropellant system, but with the output enthalpy equivalent to a bi-propellant igniter. As such, the re-startable ignition system 12 may have applicability to military aircraft, missile systems for post-stall maneuvering, emergency gas generation cycles, and many other applications relating to systems that may benefit from the re-startable ignition system.

With reference to FIG. 1, the basic components of the hybrid rocket system 10 may include a gaseous or liquid fuel container 22 or tank, a combustion portion 24, and a nozzle 26. The gaseous fuel or propellant may be nitrous oxide or gaseous oxygen or any other suitable gaseous or liquid propellant. The gaseous fuel container 22 may be disposed between a gas pressurization element 28 and a gas feed system 30. The gas feed system 30 may feed an injector portion 32, which in turn controllably injects propellant into the combustion portion 24 of the hybrid rocket system 10. The combustion portion 24 of the system may include multiple portions, such as, the ignition system 12 or pre-combustion portion, a main combustion portion 34, and a post combustion portion 36. The main combustion portion 34 may be formed of one or more solid grain fuels, such as acrylic or hydroxyl-terminated polybutadiene (HTPB), or any other suitable solid grain propellant known in the art. In one embodiment, the solid grain propellant for the main combustion portion 34 and post combustion portion 36 may be acrylonitrile butadiene styrene (ABS) or combinations of other known solid propellants. The combustion portion 24 and, more particularly, the post combustion portion 36 may be coupled to the nozzle 26 or other similar structure. The nozzle 26 may include various nozzle configurations, depending upon the application of a particular rocket system or the like. With this arrangement, the ignition system 12 of the present invention may be employed with the other components of the hybrid rocket system 10 to facilitate multiple re-starts with one device, i.e., without replacing parts.

Now with reference to FIGS. 2, 3 and 3A, various views of an ignition system 12 or pre-combustion portion are provided. As set forth, the ignition system 12 or pre-combustion portion may be directly coupled to the main combustion portion 34. The ignition system 12, as depicted in the illustrated example, is directly coupled to a shortened minimal portion of the main combustion portion 34. More important to this description is that the ignition system 12 or pre-combustion portion may include the housing 20 and first and second electrode components 40, 42.

In one embodiment, the housing 20 may include a sleeve like structure with various ports and notches therein and further, the sleeve like structure may include the internal surface 14 with a step configuration. For example, the housing 20 may include a first side 44 and a second side 46 with a bore 48 extending through and between the first and second sides 44, 46 of the housing 20. The second side 46 is illustrated as an interface surface between the housing 20 and main combustion portion 34. The bore 48 may define a centrally extending axis 50 along a length 52 of the housing 20. Further, the housing 20 may include an external surface 54 and the before mentioned internal surface 14. The external surface 54 may include cylindrical shape or any another suitable structure.

The internal surface 14 may define the bore 48 of the housing 20, the bore 48 defining a radial component such that a cross-section of the bore 48 may be defined as generally circular or any other suitable structure. Further, as set forth, the internal surface 14 may define a step configuration so as to include a shelf 56. In this manner, the bore 48 may include a first radius 58 and a second radius 60, the first radius 58 and the second radius 60 extending laterally from the axis 50 to the internal surface 14 of the housing 20. Such first radius 58 may extend along the length of the bore 48 from the first side 44 of the housing 20 to the shelf 56. The second radius 60 may extend along the length from the shelf 56 to the second side 46 of the housing 20. With this arrangement, the first radius 58 may be larger than the second radius 60 such that the bore 48 exhibits a larger opening on the first side 44 of the housing 20 than on the second side 46 of the housing 20.

With respect to FIGS. 2, 3, 3A, and 4, as set forth, the housing 20 may include various ports and/or notches therein. For example, in one embodiment, the bore 48 of the housing 20 may also include a first notch 62 and a second notch 64, each defined by the internal surface 14. The first and the second notches 62, 64 may be positioned on opposite sides of the bore 48 so as to face each other. Each of the first and second notches 62, 64 may extend between the shelf 56 and the first side 44 of the housing 20 such that the shelf 56 extends further at the notch to define a third radius 66 or a third dimension, the third radius 66 or dimension being larger than the first radius 58 and being defined from the axis 50 to the internal surface 14 at the first and second notches 62, 64. At least one of the first and second notches 62, 64 may be sized and configured to exhibit electrodes 86, 88 at, for example, base corners of the at least one of the first and second notches 62, 64 and adjacent the shelf 56, discussed in further detail herein.

Further, the housing 20 may include one or more ports for the electrode components. For example, the housing 20 may include a first port 68 and a second port 70. The first and second ports 68, 70 may be positioned opposite each other on the first side 44 of the housing 20. The first port 68 may define a first port cavity 72 (shown in outline form) extending from the first port 68 to a first port outlet 74. The first port outlet 74 may be disposed at a first base corner 76 of the first notch 62 on the shelf 56 and adjacent to the internal surface 14 having the third radius 66. Similarly, the second port 70 may extend with a second port cavity 78 to a second port outlet 80 at a second base corner 82 of the first notch 62 on the shelf 56. In this manner, the first port outlet 74 and the second port outlet 80 of the first notch 62 may be disposed at opposite first and second base corners 76, 82 of the first notch 62. A similar arrangement may be employed for the second notch 64 defining first and second outlets of port cavities extending to the first and second ports. In this manner, the ports and cavities extending to the first notch and/or the second notch may be sized and configured for positioning electrodes 86, 88 of the first and second electrode components 40, 42. In another embodiment, one or both of the notches, 62 or 64, or other port may include a pressure sensor configured to measure the pressure of the propellant at the shelf 56.

Figure 4:
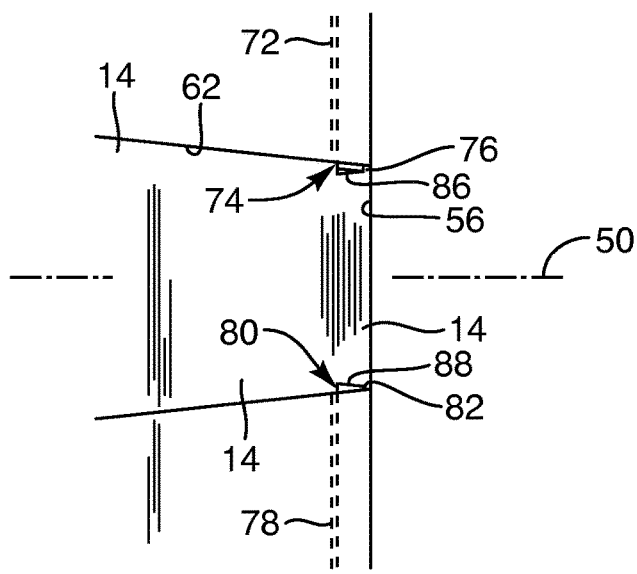
FIG. 4 is an enlarged view of detail 4 in FIG. 3A, depicting electrodes adjacent an internal surface, according to another embodiment of the present invention.

With respect to FIGS. 3A and 4, as set forth, the ignition system 12 or pre-combustion portion includes first and second electrode components 40, 42. The first and second electrode components 40, 42 may each include at least a conductive electrical wire that serves as an electrode at the end of the wire. Such electrode components may be embedded and positioned within the first and second ports 68, 70 so that respective first and second electrodes 86, 88 are exposed within the bore 48 and, more particularly at the first and second port outlets 74, 80 defined in, for example, the first notch 62. Within the bore 48, the first and second electrodes 86, 88 may be spaced a distance from each other so that, upon being electrically activated, the first and second electrodes 86, 88 provide a voltage potential or an electrical field potential adjacent the internal surface 14 between the first and second electrodes 86, 88. As depicted, such distance or spacing between the first and second electrodes 86, 88 may be defined by the first and second base corners 76, 82 in, for example, the first notch 62 in the bore 48. Further, the first and second electrodes 86, 88 may be exposed at and flush with the internal surface 14 of the bore 48. In another embodiment, the first and second electrodes 86, 88 may protrude from the internal surface 14 of the bore 48. Similar to that set forth above, another set of first and second electrodes 86, 88 may be positioned and spaced at the second notch 64.

As set forth, the housing 20 and bore 48 of this embodiment may include a step configuration to define the shelf 56. The shelf 56 may be sized and configured to act as an impingement to the oxidizer or an impingement shelf to slow the oxidizer from moving down stream so as to increase the pressure of the oxidizer at the shelf 56. The increase in pressure of the oxidizer at the shelf 56 may provide sufficient oxidizer for a combustion reaction of a solid grain fuel material on the internal surface 14. Suitable oxidizers may include gaseous oxygen, liquid oxygen, nitrous oxide, hydrogen peroxide, hydroxylammonium nitrate, ammonium dinitramide, or air. The oxidizer pressure increase at the impingement shelf 56 may enable the first and second electrodes 86, 88 to be minimally spaced (or minimally charged) to provide a charge concentration or voltage potential on the internal surface 14 of the bore 48 between the first and second electrodes 86, 88.

Figure 5:
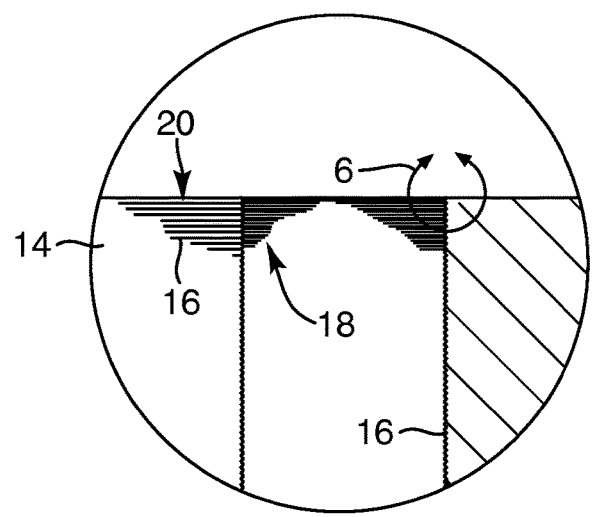
FIG. 5 is an enlarged view of detail 5 in FIG. 3B, depicting multiple layers defined in the igniter system, according to another embodiment of the present invention.

With respect to FIGS. 3B, 5, and 6, the housing 20 of the ignition system 12 may be formed from a solid grain fuel material. In one embodiment, the solid grain fuel material may be high or low density Acrylonitrile Butadiene Styrene (ABS) or any other suitable grain fuel material that holds similar electro-mechanical, combustion, and structural properties. As set forth, the housing 20 may be formed with multiple flat layers 18 deposited upon each other, employing the Fused Deposition Modeling (FDM) method or three-dimensional printing or any other suitable process for layering a fuel grain. Upon employing the FDM method, ABS possesses a very unique electro-mechanical property such that additive manufacturing results in a distinctive surface structure that is different than the surface of a monolithically fabricated (e.g., a molded or machined) ABS structure. In particular, this surface structure, such as the internal surface 14 defining the bore 48, is the surface structure that is transverse to a plane defined by any one of the multiple flat layers 18. Such surface structure or internal surface 14 has the effect of concentrating electrical charges locally when the surface 14 of the ABS material is subjected to an electrical potential field. These high-charge concentrations produce localized electrical arcing such that the ABS material breaks down at voltages significantly lower than that of a monolithically fabricated ABS structure. Described another way, the voltage potential created between the first and second electrodes 86, 88, when electrically activated, causes the unique features (the ridges 16 formed in the multiple flat layers 18 shown in FIG. 6) of the surface 14 to act as micro-electrodes which ignites the solid grain fuel material in the presence of an oxidizer.

In one embodiment, the multiple flat layers 18 may be deposited so that any one of the flat layers 18 define a plane that is transverse or perpendicular with the axis 50 of the housing 20. In another embodiment, the first and second electrodes 86, 88 (see FIG. 4) may define a line therebetween that may be generally parallel with a plane defined by each of the multiple flat layers 18. In still another embodiment, each of the flat layers 18 may define a plane that is substantially parallel with the axis 50 of the housing 20. In any one of these embodiments, the multiple flat layers 18, deposited upon each other, form the internal surface 14 with ridges 16 or ridged layering. The ridges 16 or ridged layering may be defined by peripheral ends 90 of the multiple flat layers 18. As set forth, the unique mechanical structure (e.g., the surface characteristics created by the FMD layering) of the ridges 16 and multiple flat layers 18, in conjunction of the material being a solid grain fuel, such as ABS material, act as multiple micro-electrodes when subjected to an electrical potential field. Such unique mechanical structure facilitates the ignition system 12 to implement multiple re-starts. For example, even as material from the internal surface 14 is initially consumed or removed through combustion, a newly exposed internal surface 14 maintains similar surface characteristics or surface roughness that act as micro-electrodes when exposed to an electrical potential field.

With respect to FIG. 6, an enlarged view of the multiple flat layers 18 and ridges of the fuel grain material are depicted. As set forth, the internal surface 14 defines ridges or ridged layering formed between each of the multiple flat layers 18. Each of the flat layers 18 may include a peak 92 with a small radius at its peripheral end such that the structure may also include a slope extending to the peak that may be substantially linear or radial. Although depicted as uniform ridges 16, such ridges may not be uniform along the internal surface 14 of the housing 20. In this manner, the internal surface 14 may exhibit a rough, coarse or scratched surface. The ridges may exhibit a nodal configuration or exhibit a protruding structure that may continue or discontinue along the peripheral end 90 of each of the multiple flat layers 18. Likewise, the internal surface 14 may exhibit grooves 94 formed between each of the multiple flat layers 18. In other words, each groove 94 extends between adjacently extending ridges 16. With this arrangement, the FDM technique of forming the housing, preferably with ABS material, provides for a unique electro-mechanical structure such that the flat layers 18 that exhibit the ridges 16 and/or grooves 94 therein reacts to an electrical potential field. In this manner, the structure and material itself act as multiple micro-electrodes, thereby, facilitating electrical breakdown to facilitate a re-startable ignition for a hybrid rocket system.

Figure 7:
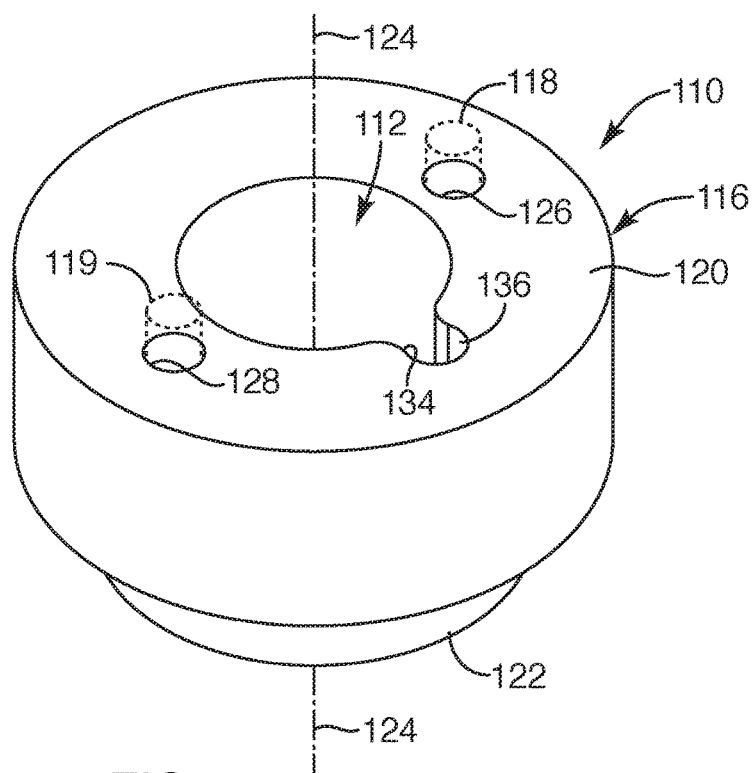
FIG. 7 is a perspective view of another embodiment of an igniter system, according to the present invention.
Figure 8A:
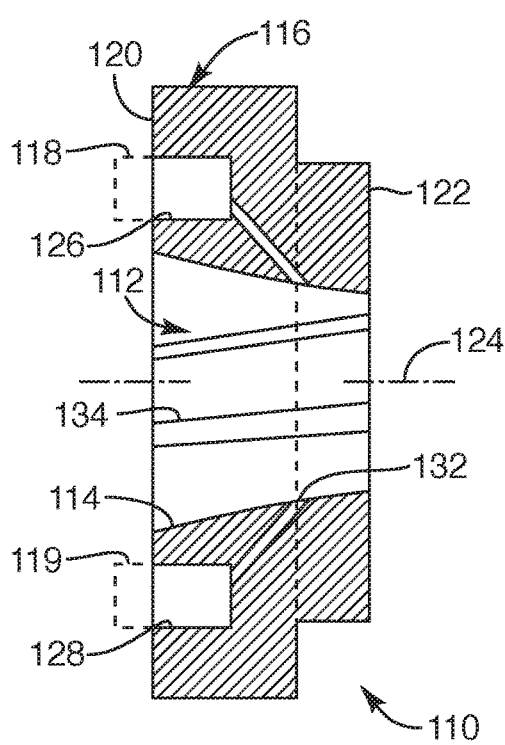
FIG. 8A is a cross-sectional view of the igniter system taken along section 8A of FIG. 8, according to another embodiment of the present invention.
Figure 8:
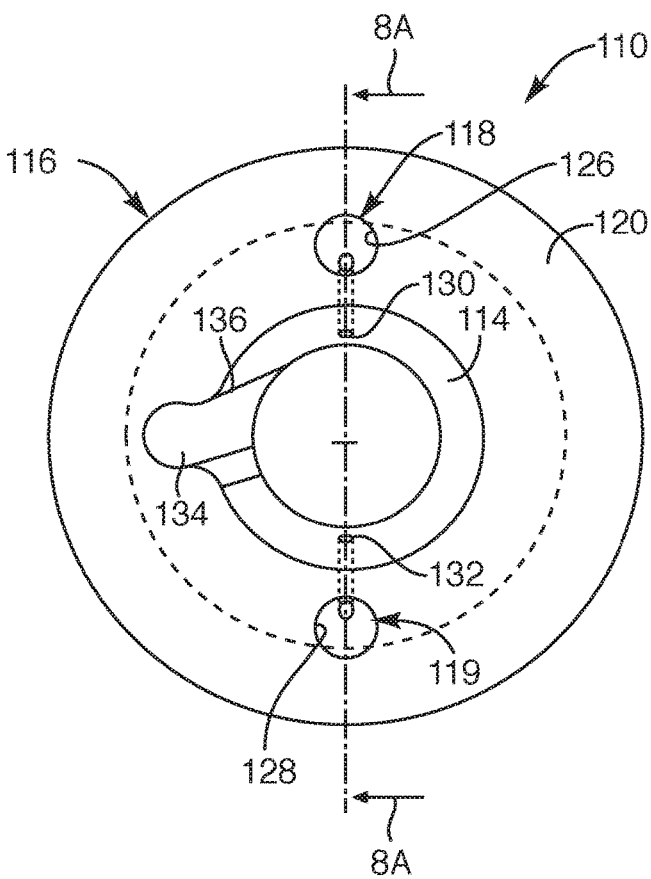
FIG. 8 is a top view of the igniter system of FIG. 7, according to another embodiment of the present invention.

With respect to FIGS. 7, 8, and 8A, another embodiment of an ignition system 110 for a hybrid rocket system 10 (FIG. 1) is provided. This embodiment is similar to the previous embodiment, except this embodiment exhibits a bore 112, defined by an internal surface 114, with a convergent or conical configuration. For example, the ignition system 110 may include a housing 116 and first and second electrode components 118, 119. The housing 116 may include a first side 120 and a second side 122 with the bore 112 extending through and between the first and second sides 120, 122. The bore 112 may define a centrally located axis 124 extending along the length of the housing 116. The housing 116 may include first and second electrode ports 126, 128 that may extend from the first side 120 to a convergent portion of the bore 112 so that a first and second electrode 130, 132 may be exposed within the bore 112. The housing 116 may also include a pressure port 134 with a corresponding pressure sensor 136 so that a pressure within the bore 112 may be determined upon receiving the propellant. Similar to that described and depicted in FIG. 6 of the previous embodiment, the housing 116 of this embodiment may be formed with multiple flat layers 18 that exhibit a roughened surface or ridges 16 that provide the before-discussed unique structural characteristic along the internal surface 114 of the conical bore 112. In this manner, upon the first and second electrodes 130, 132 being activated to provide an electrical potential field, the multiple flat layers 18 deposited upon each other and exhibiting the ridges 16 and/or grooves 94 react and concentrate a charge, thereby, acting as multiple micro-electrodes at the internal surface 114 of the bore 112.

As set forth in this embodiment, the bore 112 in the housing 116 is convergent. The bore 112 may be sized and configured to converge so as to increase the pressure of the oxidizer as it moves downstream through the bore 112. The increase in pressure of the oxidizer as it moves downstream through the bore 112 may provide sufficient oxidizer for a combustion reaction of a solid grain fuel material on the internal surface 114. Suitable oxidizers may include gaseous oxygen, liquid oxygen, nitrous oxide, hydrogen peroxide, hydroxylammonium nitrate, ammonium dinitramide, or air. The oxidizer pressure increase at the narrower portion of the bore 112 may enable the first and second electrodes 130, 132 to be minimally spaced (or minimally charged) to provide a charge concentration or voltage potential on the internal surface 114 of the convergent portion of the bore 112 between the first and second electrodes 130, 132.

Similar to previous embodiments, the multiple flat layers 18, deposited upon each other, form the internal surface 114 with ridges 16 or ridged layering. The unique mechanical structure (e.g., the surface characteristics created by the FMD layering) of the ridges 16 and multiple flat layers 18, in conjunction of the material being a solid grain fuel, such as ABS material, act as multiple micro-electrodes on the internal surface 114 when subjected to an electrical potential field. Such unique mechanical structure facilitates the ignition system 116 to implement multiple re-starts. For example, even as material from the internal surface 114 is initially consumed or removed through combustion, a newly exposed internal surface 114 maintains similar surface characteristics or surface roughness that act as micro-electrodes when exposed to an electrical potential field from charged electrodes 130, 132.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A restartable ignition device, comprising:
   a housing formed through additive-manufacture layering multiple flat layers of a solid-grain fuel material deposited upon each other, the housing having a first side and a second side, the housing defining a bore with an axis, the bore extending therethrough between the first and second sides, the bore defined by an internal surface of the solid-grain fuel material within the housing, and the bore configured to pass an oxidizer therethrough; and
   at least two electrodes extending through the housing to the internal surface, the at least two electrodes configured to be spaced apart so as to provide an electrical potential field along the internal surface of the solid-grain fuel material between the at least two electrodes;
   wherein:
   the multiple flat layers provide ridges along the internal surface configured to concentrate an electrical charge on the ridges, which act as micro-electrodes that produce localized electrical arcing thereon and ignite the internal surface of the solid-grain fuel material upon being subjected to the electrical potential field; and
   the housing is configured such that as the solid-grain fuel material from the internal surface is initially consumed or removed through combustion of the solid-grain fuel material, a newly exposed internal surface of the solid-grain fuel material has newly exposed ridges that act as newly exposed micro-electrodes that produce localized electrical arcing thereon and re-ignite the newly exposed internal surface of the solid-grain fuel material upon being subjected to the electrical potential field.

2. The ignition device of claim 1, wherein the internal surface comprises grooves, each groove extending between two adjacently extending ridges.

3. The ignition device of claim 1, wherein each of the ridges are a periphery of each of the multiple flat layers.

4. The ignition device of claim 1, wherein the multiple flat layers each define a plane oriented transverse relative to the axis of the bore.

5. The ignition device of claim 1, wherein the at least two electrodes define a line therebetween, the line being generally parallel with a plane defined by each of the multiple flat layers.

6. The ignition device of claim 1, wherein the internal surface defines a step configuration such that the bore at the first side is larger than the bore at the second side, the step configuration exhibiting a shelf extending to a shelf notch, the shelf notch having the at least two electrodes.

7. The ignition device of claim 1, wherein the bore at the first side defines a first width and the bore at the second side defines a second width, the first width greater than the second width.

8. The ignition device of claim 1, wherein the bore comprises a convergent configuration extending from the first side to the second side.

9. The ignition device of claim 1, wherein the solid-grain fuel material is an Acrylonitrile Butadiene Styrene (ABS) material.

10. A method of forming a restartable ignition device, the method comprising:
    forming a housing through additive-manufacture layering with multiple flat layers of a solid-grain fuel material deposited upon each other, the housing having a first side and second side defining a bore with an axis, the bore extending through the housing between the first and second sides such that the bore is defined by an internal surface of the housing and the bore configured to pass an oxidizer therethrough; and
    positioning at least two electrodes to extend through the housing to the internal surface such that the at least two electrodes are spaced and configured to provide an electrical potential field along the internal surface of the housing between the at least two electrodes;
    wherein:
    the forming the housing with the multiple flat layers of the solid-grain fuel material comprises forming the internal surface of the housing to include ridges, the ridges along the internal surface of the housing being configured to concentrate an electrical charge thereon upon being subjected to the electrical potential field; and
    the forming the housing further comprises configuring the housing such that as the solid-grain fuel material from the internal surface of the housing is initially consumed or removed through combustion of the solid-grain fuel material, a newly exposed internal surface of the housing has newly exposed ridges that act as newly exposed micro-electrodes upon being subjected to the electrical potential field.

11. The method according claim 10, wherein the forming the internal surface of the housing to include ridges comprises forming multiple micro-electrodes from the solid-grain fuel material, the micro-electrodes configured to arc the electrical charge on the newly exposed internal surface of the housing between the at least two electrodes.

12. The method according to claim 10, wherein the forming the housing with multiple flat layers comprises forming the multiple flat layers in a plane oriented transverse relative to the axis of the bore.

13. The method according to claim 10, wherein the positioning the at least two electrodes comprises positioning the at least two electrodes to define a line therebetween such that the line is generally parallel with a plane defined by each of the multiple flat layers.

14. The method according to claim 10, wherein the forming the housing through additive-manufacture layering with multiple flat layers comprises forming the bore of the housing to include a step configuration to define a shelf.

15. The method according to claim 10, wherein the forming the housing through additive-manufacture layering with multiple flat layers comprises forming the bore of the housing to include a convergent configuration extending from the first side to the second side of the housing.

16. The method according to claim 10, wherein the forming the housing through additive-manufacture layering with multiple flat layers comprises forming the housing with layers of an Acrylonitrile Butadiene Styrene (ABS) material.

17. A restartable, hybrid-rocket system, comprising:
 a container sized to contain a liquid or gaseous oxidizer;
 an ignition portion formed from multiple flat layers of a solid-grain fuel material deposited upon each other through additive-manufacture layering, the ignition portion having a first side and a second side, the ignition portion defining a bore with an axis, the bore extending therethrough between the first and second sides, the bore defined by an internal surface and the bore configured to receive the oxidizer from the container, the ignition portion including at least two electrodes configured to provide an electrical potential field along an internal surface of the solid-grain fuel material between the at least two electrodes;
 a solid-grain combustion portion defining a combustion chamber, the combustion chamber corresponding with the bore of the ignition portion;
 a post-combustion portion coupled to the solid-grain combustion portion; and
 a nozzle coupled to the post-combustion portion configured to manipulate thrust to the rocket system;
 the multiple flat layers of solid-grain fuel of the ignition portion providing ridges along the internal surface of the solid-grain fuel material configured to concentrate an electrical charge on the internal surface of the solid-grain fuel material between the at least two electrodes upon being subjected to the electrical potential field; and
 the ignition portion is configured such that as the solid-grain fuel material from the internal surface is initially consumed or removed through combustion of the solid-grain fuel material, a newly exposed internal surface of the solid-grain fuel material has newly exposed ridges that act as newly exposed micro-electrodes that produce localized electrical arcing thereon and re-ignite the newly exposed internal surface of the solid-grain fuel material upon being subjected to the electrical potential field.

18. The hybrid rocket system of claim 17, wherein the multiple flat layers each define a plane oriented transverse relative to the axis of the bore.

\* \* \* \* \*